United States Patent [19]

Sergay

[11] 3,724,833

[45] Apr. 3, 1973

[54] REVERSIBLE ENERGY ABSORBING BUMPER SYSTEM

[76] Inventor: Dimitry B. Sergay, 427 Dorothy Drive, King of Prussia, Pa, 19406

[22] Filed: Mar. 12, 1971

[21] Appl. No.: 123,759

[52] U.S. Cl. ................................267/140, 293/88
[51] Int. Cl. ............................................F16f 7/00
[58] Field of Search ........293/85, 86, 87, 88; 267/30, 267/139, 140, 151, 152; 267/181

[56] References Cited

UNITED STATES PATENTS

| | | | |
|---|---|---|---|
| 1,839,015 | 12/1931 | Deveaux | 293/88 |
| 3,493,257 | 2/1970 | Fitzgerald et al. | 293/71 R |
| 2,594,665 | 4/1952 | Lockwood | 267/28 |
| 3,361,467 | 1/1968 | Ludwikowski | 293/85 |

FOREIGN PATENTS OR APPLICATIONS

| | | | |
|---|---|---|---|
| 915,053 | 1/1963 | Great Britain | 267/151 |
| 363,658 | 12/1931 | Great Britain | 293/86 |

Primary Examiner—James B. Marbert
Assistant Examiner—Robert Saifer
Attorney—Maleson, Kimmelman and Ratner and Morton J. Rosenberg

[57] ABSTRACT

An energy absorbing, reusable and reversible system for absorbing substantially longitudinal impact forces and dissipating the impact energy therefrom. The bumper system includes an impact frame having pre-contoured rib members which are distended in a radial direction when the impact forces are applied to the system. A resilient sleeve surrounds the impact frame to absorb energy and force the rib members to their initial unloaded contour. Energy absorption is accomplished through a combination of loading the rib members into or near the plastic stress region and the resiliency of the surrounding sleeve.

20 Claims, 5 Drawing Figures

PATENTED APR 3 1973 3,724,833

INVENTOR
DIMITRY B. SERGAY

BY Morton J. Rosenberg
ATTORNEY

REVERSIBLE ENERGY ABSORBING BUMPER SYSTEM

BACKGROUND OF THE INVENTION

1. Field of the Invention

This invention relates to the field of energy absorbing devices. In particular, this invention pertains to the field of reusable and reversible systems for energy absorption. More in particular, this invention relates to the field of energy absorbing bumper systems for use on moveable vehicles possibly subjected to impact forces.

2. Prior Art

Energy absorbing bumper systems are known in the art, however most systems shown in the prior art provide for singular displacement direction spring members to absorb and dissipate the energy. Such prior art does not permit a transferral in direction of any load characteristics imposed on these systems.

In some prior art elastomeric materials are used to cushion a direct impact force. These prior art devices provide energy absorption as a function of direct interaction of the force with the cushioning material. In such apparatus no combination of moveable rib members transferring a load direction to a resilient shroud has been found.

Other prior art systems do show radially extended enlargements which may be forced into a resilient shoulder upon being impacted. However, such prior art does not provide for a resilient housing to initially surround the enlargements and therefore provide radial compressive action on the enlargements after the force impact for a cyclical completely automatic operation.

In some prior art systems, apparatus are provided wherein actuation is provided through compressive fluid escape, hydraulic mechanisms and fluid drive. Such systems in some cases are reusable and reversible but do not include a compact, substantially maintenance free mechanism which is easily manufactured at low cost as in the present invention.

SUMMARY OF THE INVENTION

It is an object of the subject invention to provide an energy absorbing, reusable system for dissipating energy.

It is a further object of the present invention to provide an energy absorbing mechanism that is reversible after an impact force has been relieved to allow the automatic return of the mechanism to its original geometrical contour.

Another object of the subject invention is to provide a bumper system for use on a moveable vehicle to be used in conjunction with a faceplate or bumper or as a primary impact loader.

A still further object of the present invention is to provide a bumper system which is easily manufactured, of low cost and is compact for ease of installation on moveable vehicles.

A reversible energy absorbing bumper system which includes an impact frame to be outwardly extendable from a longitudinal axis of the frame when a substantially longitudinal force is applied to the bumper system. A resilient shroud receives and compresses the impact frame when the frame is extended outwardly.

DESCRIPTION OF THE PREFERRED EMBODIMENT

Figure 1:
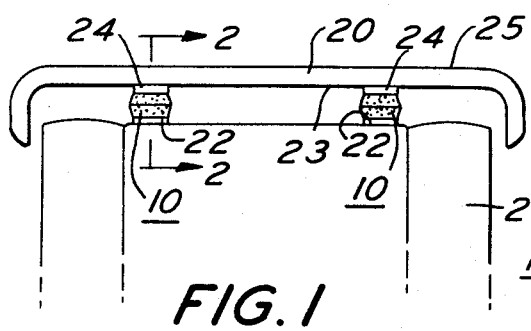
FIG. 1 is a top view of a pair of energy absorbing bumper systems attached on opposing ends to a vehicle frame and a faceplate.
Figure 3:
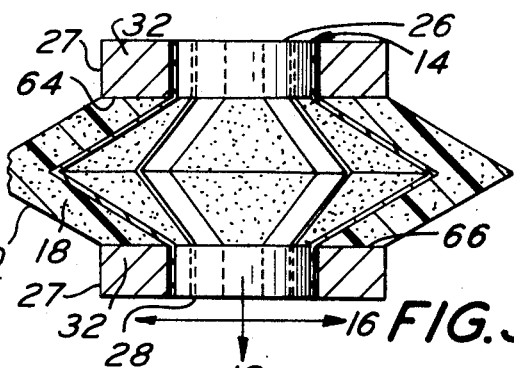
FIG. 3 is an elevational section view of the energy absorbing system in a compressively stressed condition.
Figure 2:
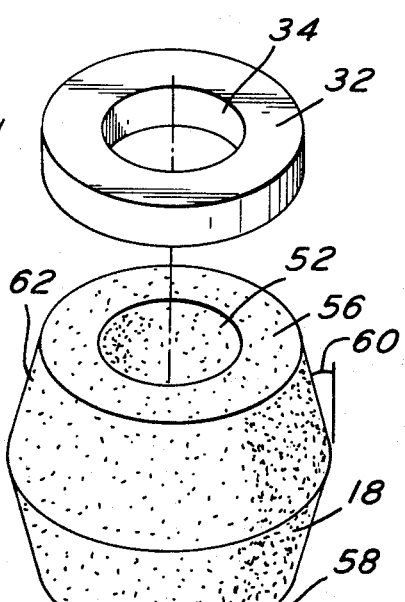
FIG. 2 is an elevation sectional view of the energy absorbing system in an initial or unstressed condition taken along the section line 2—2 of FIG. 1.

Referring now to FIGS. 1, 2, and 3 there is shown energy absorbing cell, or bumper system 10 to provide a reusable and reversible mechanism which absorbs and dissipates energy when impacted by a force in substantially longitudinal direction 12. An impact force causes a compression deflection of cell 10 in direction 12 as well as in an outwardly directed radial dimension 16. When the force is removed, system 10 returns to its original unstressed condition dimensions. The component deforming elements of system 10 include impact frame or liner 14 and resilient shroud or elastic housing 18 which is radially 16 stressed and longitudinally 12 compressed upon inception of the impact force. Shroud 18, as will be discussed in detail in following paragraphs is composed of a high density cellular material which being elastic in nature absorbs and dissipates the impact energy and then forces system 10 in a reversal cycle to its unstressed dimensions.

In use, bumper system 10 may be attached to bumper guard, or face plate 20 of a vehicle on a first end 24 and secured to vehicle frame 21 at second end 22. As is shown in FIG. 1, cells 10 may be positioned at a plurality of points along inner circumference 23 of faceplate 20 dependent upon the particular application desired. In this concept, a force applied to outer circumference 25 of bumper 20 may be transmitted to a multiplicity of cells 10. In other forms, system 10 may be used in unitary fashion to singularly absorb the energy characteristics of a substantially longitudinal impact force.

In the basic conceptual model bumper system 10 incorporates the loading of a high density cellular housing 18 through radial expansion of a steel interliner. In addition, the radially expanding steel liner also may absorb impact loading energy when loaded in the plastic region at hinge lines or apexes 46 as will be discussed in detail. In this manner system 10 provides optimized energy absorption characteristics as a function of impact load and system deflection.

Figure 5:
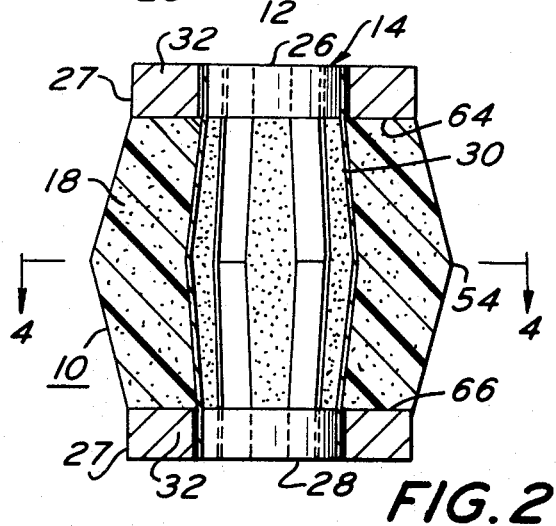
FIG. 5 is an exploded perspective illustration of the energy absorbing system.
Figure 5:
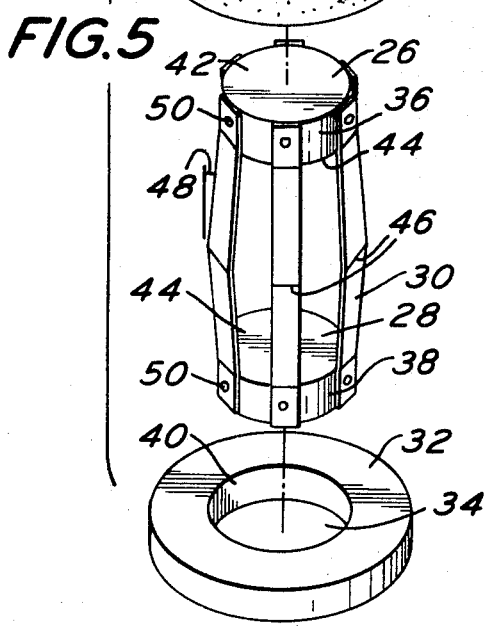

As shown in FIGS. 2, 3, and 5, impact frame or liner 14 includes first and second impact members 26, 28 rib or extension members 30 passing in substantially longitudinal direction 12 being rigidly secured on opposing ends thereof to first and second impact members 26, 28. Additionally, impact frame or liner 14 also defines ring supports 32 having an annular contour as described in FIG. 5. Annular rings 32 include through openings or passages 34 substantially equal in diameter to the external diameter of first and second impact members 26, 28. As shown, each bumper system or energy absorbing cell 10 operably includes a pair of longitudinally opposing annular rings 32. In construction, rings 32 are mated or fitted to lateral walls 36, 38 of first and second impact members 26, 28 to permit contiguous interfacing between inner annular wall 40 and lateral wall surfaces 36, 38. Material construction of rings 32 constitute a composition of mild or spring steel, or like material able to withstand the imposed forces. Illustrative sizing of rings 32 adapted for use on faceplate or bumper 20 provides an inner annular diameter of approximately 2.5 inches and an external diameter of 4 inches with lateral walls 27 having an approximate length of 0.75 inches. However, such sizing of cells 10 are dependent on a particular function of materials and impact force not important to the basic inventive concept.

First and second impact members 26, 28 are displaced from each other in longitudinal direction 12, however, they are aligned with respect to each other along a longitudinal axis of cell 10. Impact members 26, 28 are disk shaped in geometrical contour having upper and lower base surfaces 42, 44 with lateral walls 36 providing a specified thickness for members 26, 28 wherein rib or extendable arms 30 may be rigidly secured on opposing ends thereof to peripheral walls 36. In general, members 26, 28 may be formed geometrically in a manner such that the cross-sectional area plane normal to longitudinal direction 12 defines a many sided polygon or other like symmetrical configuration such as a circle as shown. The only restriction in the contouring of members 26, 28 being that such be compatible with equal angular spacing of arms 30 circumferential to walls 36. In construction, members 26, 28 may be made of a variety of steel based materials or like compositions sufficient to withstand the imposed forces and maintain the structural integrity of unit 10. Opposing impact members 26, 28 have an external diameter substantially equal to but slightly less than ring supports 32 for insertion and mating of corresponding lateral surfaces 36 and 40.

Figure 4:
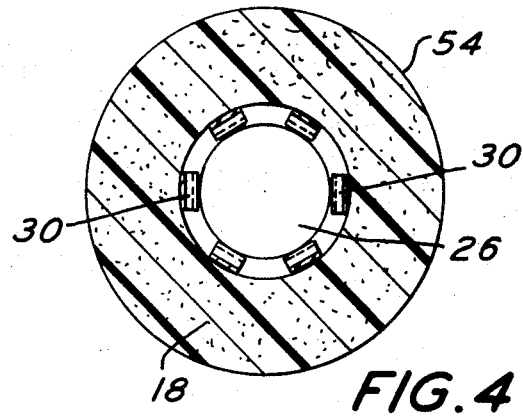
FIG. 4 is a cross-section view of the energy absorbing system taken along the section line 4—4 of FIG. 2.

Rib or extension members 30 extend substantially longitudinal between, and are rigidly secured to first and second impact members 26, 28. As shown in FIG. 4 the plurality of ribs 30 are positioned around the circumference of lateral walls 36, angularly displaced in an equal manner about the peripheral boundary. For illustrative purposes, FIG. 4 details six rib members 30 displaced angularly at 60° to a next consecutive member, however, such displacement is a function of the number of ribs 30 used and is not important to the inventive concept as herein defined. In this manner, rib members 30 determine the radial expansion properties of system 10.

Each of arms 30 have an outwardly directed apex 46 with respect to longitudinal direction 12 at a location substantially mid-point to the displaced distance between first and second members 26, 28. As formed, apex angle 48 is directed to allow outward translation of arms 30 when an impact load is applied to system 10 in substantially longitudinal direction 12. Apex angle 48 is found through experimental tests to be optimally effective when formed within a range of 5°–15°, however such is highly dependent upon the material properties of arms 30. Dimensionally, arms 30 define a rectangular cross-section approximately 5.5 inches in length and 0.5 inches in width.

Ribs 30 are rigidly secured to opposing impact members 26, 28 through bolts 50, weld, adhesive securement or other such means not important to the inventive concept. In construction, members 30 may be composed of mild or spring steel or like material which permits reversible expansion of arms 30 in radial direction 16.

Ring support or annular element 32 having an internal diameter of through opening, 34 slightly greater than the external diameters of impact members 26, 28 is slideable inserted over corresponding lateral walls 36. Rings 32 may after insertion be welded or otherwise rigidly secured to lateral walls 36 thus providing a unitary, rigidly secured assembly 10. As previously described, it is preferred to form rings 32 of the same, or similar material as that described for impact members 26, 28 to insure similar compressive loading characteristics over assembly or cell 10.

Resilient shroud, elastic housing or elastomeric cylinder 18 includes longitudinally directed through passage 52 as detailed in FIG. 5. Impact frame 14 is inserted within passage 52 for releasably securing liner 14 to housing 18. The internal diameter of passage 52 of resilient shroud 18 is substantially equal to the external diameters of impact members 26, 28. Housing 18 being elastic in nature, is deformable in outward radial direction 16 to permit insertion of apexes 46 of ribs 30 through a force fitting. Housing lateral wall 62 is sloped from a maximum wall thickness at apex 54 to a minimum wall thickness at opposing end housing surfaces 56, 58. Apex 54 is located approximately longitudinally mid-point between the length of housing 18. Housing apex angle 60 approximates an angular arc of 15°, however, such is not important to the inventive concept herein described. Lateral wall 62 therefore provides an inclined outer surface extending from opposing surfaces 58, 56 to apex 54. In a plane normal to longitudinal direction 12, it is seen that housing 18 takes the contour of an annulus. Upon insertion of impact frame 14 within housing 18, rib apexes 46 are radially aligned with housing apex 54. As shown in FIG. 2 the longitudinal dimension of housing 18 substantially approximates the displacement distance between ring supports 32 and annularly interfaces thereto on lower surfaces 64, 66. In final assembly, housing 18 interfaces with and is contiguous longitudinal to arms 30 of impact frame 14 and as has been described, annularly with ring supports 32 to form a one piece energy absorbing cell 10.

Annularly shaped housing 18 is constructed of a high density cellular material such as polyurethane having a density range between 10 and 80 pounds per cubic foot. The aforementioned density range includes a compressive strength between approximately 300 and 5,000 pounds per square inch. Under compressive stress such material construction responds to a broad range of load bearing or cushioning properties. In addition, such materials show a great resistance in breakdown to a repeated stretching or deflection.

In operation, bumper system or energy absorbing cell 10 is impacted with a force substantially longitudinally directed 12. This force may be through direct interface or transmitted through faceplate or bumper 20 as shown in FIG. 1. In normal operating procedure, system 10 may be arranged in symmetrical relation to a longitudinal axis passing normal to the plane of faceplate 20 in a plurality of positionings. The aforementioned and described arrangement and specific number of systems 10 to be used are dependent on the particular structural requirements and loading bearing characteristics for a predetermined condition. An impacting force provides for a compressive deflection in direction 12 forcing a decrease in the longitudinal displacement between first and second impact members 26, 28. The compressive deflection imparts the necessary drive to expand arms 30 in radial direction 16 against elastic housing 18. Resilient shroud 18 being outwardly stretched or deflected absorbs a portion of the energy imparted by the impact force. After removal of the impact force, elastic housing 18 provides the necessary compressive force to reposition arms 30 in their original unstressed geometrical contour. From the above discussion, it is seen that the major proportion of the impact force energy is removed through stressing arms 30 into the plastic range as well as through housing 18 absorption. In this manner, the cycle of energy absorbing cell 10 is reversible and is prepared for a next impacting load stress.

In a basic description of system 10, the concept entails the loading of cylinder 18, made of an elastomeric material, through radial expansion of arms 30. Ribs 30 are forced in the proper direction when a compressive or substantially longitudinal force is imparted to the prestressed specific contour as shown. Arms 30 when radially expanded 16, are loaded into their plastic region at apex 46. Once arms 30 are transferred to an outward displacement, the loading of the high density polyurethane foam sleeve 18 is stressed sufficiently to force arms 30 to their original position thus allowing energy absorption combined with reversibility to insure a reusable system 10.

As is seen in FIG. 1, system 10 may be secured to faceplate 20 and corresponding vehicle frame 21 through a variety of fastenings. Although such fastening means are not important to the inventive concept, such may be incorporated through bolts directed into first and second impact members 26,28. Other variations of securing system 10 to rigid members 20, 21 include welding, flange attachments and possible adhesive contact or some combination of the aforementioned methods.

In order to stiffen and control the location of plastic hinge lines or apexes 46 of ribs 30 other variations present themselves to those skilled in the art. Ribs 30, for instance, may be constructed of small diameter steel tubing and crimped at bend lines 46. Crimping of arms 30 may also be accomplished on opposing sides of apexes 46 to provide a more complete control of the plastic hinge lines when stressed by an impact load.

The invention herein described has been shown to be an effective, reversible energy absorbing system which provides absorption of high loadings with an easily manufactured, low cost apparatus. While the invention has been described with a certain specific embodiment thereof, it will now be understood that further modifications will suggest themselves to those skilled in the art, and it is intended to cover such modifications within the scope of the appended claims.

What is claimed is:

1. A reversible energy absorbing bumper system, comprising:
   a. an impact frame including at least one substantially longitudinally directed arm having an unloaded elongated extension, said extension being adapted to extend outwardly from a longitudinal axis of said frame when a force having a longitudinal component is applied to said bumper system; and,
   b. shroud means of an elastomeric material for receiving said impact frame, said shroud means being the primary restoring means for restoring said frame to said unloaded extension after said impact frame is extended outwardly.

2. The bumper system as recited in claim 1 wherein said impact frame comprises:
   a first and second impact member being longitudinally displaced from each other, said arm defining an extension means being rigidly secured to said first and second impact members on opposing ends of said extension means.

3. The bumper system as recited in claim 2 wherein said impact frame includes a pair of ring elements having through openings, said first and second impact members insertable within said through openings and rigidly secured thereto.

4. The bumper system as recited in claim 2 wherein said first and second impact members include cylindrical disk elements, said impact members being axially aligned with respect to said longitudinal axis.

5. The bumper system as recited in claim 2 wherein said first and second impact members define a pair of disc members having a predetermined diameter and longitudinally directed thickness.

6. The bumper system as recited in claim 2 wherein said arm comprises an expandable element which extends substantially longitudinal between and rigidly secured to said first and second impact members, said expandable element having an outwardly directed apex with respect to said longitudinal axis at a predetermined location substantially midpoint between said first and second impact members.

7. The bumper system as recited in claim 2 wherein said extension means comprises a plurality of translatable elements having opposing ends rigidly secured to a peripheral surface of said first and second impact members respectively, said translatable elements having a monotonically decreasing contour from a location substantially midpoint between said impact members and being translatable in an outward direction with respect to said longitudinal axis when said force having said longitudinal component is applied to said bumper system.

8. The bumper system as recited in claim 7 wherein said plurality of translatable elements are angularly oriented substantially equidistant from each other around said periphery of said impact members.

9. The bumper system as recited in claim 1 wherein said shroud means includes an elastic housing having a longitudinally directed through opening, said impact frame being insertable within said through opening for releasably securing said impact frame to said elastic housing.

10. The bumper system as recited in claim 9 wherein said elastic housing is constructed of a cellular material, said housing being annularly shaped in a cross-sectional plane normal to said longitudinal axis.

11. The bumper system as recited in claim 10 wherein said annularly shaped housing defines a pair of opposing longitudinal end surfaces, said housing having a radial wall thickness monotonically increasing to a maximum thickness substantially midpoint of said opposing longitudinal end surfaces.

12. The bumper system as recited in claim 10 wherein said annularly shaped housing is constructed of a high density cellular material.

13. The bumper system as recited in claim 12 wherein said annularly shaped housing is constructed of a high density polyurethane material.

14. The bumper system as recited in claim 13 wherein said housing is constructed of a polyurethane material having a density range between 10 and 80 pounds/cu.ft.

15. A method for reversibly absorbing bumper loads including the steps of:
   a. displacing a substantially rigid impact frame having a predetermined longitudinally directed unloaded geometric configuration;
   b. compressing a shroud member of elastomeric material, said shroud member surrounding and being contiguous to said impact frame; and,
   c. forcing said impact frame to said unloaded geometric configuration primarily through a transverse compressive force of said shroud member acting on said impact frame.

16. The method for reversibly absorbing bumper loads as recited in claim 15 wherein the step of displacing said substantially rigid impact frame is preceded by the step of applying a force to said impact frame, said force having a component in said longitudinal direction.

17. The method for reversibly absorbing bumper loads as recited in claim 16 wherein the step of displacing said substantially rigid impact frame includes the step of longitudinally compressing said impact frame a predetermined distance responsive to said applied force.

18. The method for reversibly absorbing bumper loads as recited in claim 17 wherein the step of displacing said substantially rigid impact frame includes the step of outwardly extending said impact frame from a longitudinal axis of said frame when said force is applied.

19. The method for reversibly absorbing bumper loads as recited in claim 15 wherein the step of compressing said shroud member includes the step of displacing said shroud member in a direction substantially transverse said longitudinal direction.

20. The method for reversibly absorbing bumper loads as recited in claim 19 wherein the step of compressing said shroud member includes the step of longitudinally compressing said shroud member a predetermined distance.

* * * * *